(12) United States Patent
Lee (10) Patent No.: US 8,708,567 B2
(45) Date of Patent: Apr. 29, 2014

(54) SLIDING BEARING AND SLIDING BEARING ASSEMBLY

(75) Inventor: Chung Rae Lee, Gyonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 13/517,310

(22) PCT Filed: Dec. 8, 2010

(86) PCT No.: PCT/KR2010/008729
§ 371 (c)(1),
(2), (4) Date: Sep. 17, 2012

(87) PCT Pub. No.: WO2011/078499
PCT Pub. Date: Jun. 30, 2011

(65) Prior Publication Data
US 2012/0328224 A1  Dec. 27, 2012

(30) Foreign Application Priority Data
Dec. 22, 2009  (KR) ........................ 10-2009-0129324

(51) Int. Cl.
*F16C 33/10* (2006.01)
(52) U.S. Cl.
USPC ........................................................ 384/293
(58) Field of Classification Search
CPC ...... F16C 17/02; F16C 33/10; F16C 33/1025; F16C 33/103; F16C 2240/44
USPC .................................. 384/93, 282–294, 322
See application file for complete search history.

(56) References Cited

U.S. PATENT DOCUMENTS

| | | | | |
|---|---|---|---|---|
| 1,746,020 | A * | 2/1930 | Whiteley | 384/284 |
| 1,751,906 | A * | 3/1930 | Clark | 384/285 |
| 3,300,259 | A * | 1/1967 | Howard | 384/291 |
| 3,343,893 | A * | 9/1967 | Hall | 384/291 |
| 4,342,491 | A * | 8/1982 | Jamison et al. | 384/286 |
| 5,490,730 | A * | 2/1996 | Akita et al. | 384/147 |
| 6,089,756 | A * | 7/2000 | Ono et al. | 384/322 |
| 6,095,690 | A * | 8/2000 | Niegel et al. | 384/293 |
| 6,241,393 | B1 * | 6/2001 | Georges et al. | 384/130 |
| 6,354,822 | B1 * | 3/2002 | Lifson et al. | 418/55.6 |

(Continued)

FOREIGN PATENT DOCUMENTS

| KR | 10-2005-0011995 A | 1/2005 |
|---|---|---|
| KR | 10-2007-0112795 A | 11/2007 |

OTHER PUBLICATIONS

Search Report dated Sep. 23, 2011 written in Korean with English translation attached for International application No. PCT/KR2010/008729, 5 pages.

(Continued)

*Primary Examiner* — Thomas R Hannon
(74) *Attorney, Agent, or Firm* — John D. Veldhuis-Kroeze; Westman, Champlin & Koehler, P.A.

(57) ABSTRACT

The present disclosure relates to a sliding bearing, and more specifically to a sliding bearing in which lubricating properties are improved by providing lubricating-oil-storage locations in the inner circumferential surface and the outer circumferential surface. The sliding bearing of the present disclosure has properties which are particularly advantageous when used under surface-pressure conditions of from 100 to 1,000 kg/cm$^2$ and speed conditions of from 0.005 to 0.1 m/second.

10 Claims, 5 Drawing Sheets

(56) References Cited

U.S. PATENT DOCUMENTS

| | | | |
|---|---|---|---|
| 6,634,791 B2* | 10/2003 | Ono et al. | 384/291 |
| 6,709,160 B1* | 3/2004 | Ward et al. | 384/286 |
| 6,896,411 B2* | 5/2005 | Lee | 384/285 |
| 2005/0141792 A1* | 6/2005 | Chen | 384/322 |
| 2005/0286822 A1 | 12/2005 | Maruyama et al. | |
| 2008/0152271 A1* | 6/2008 | Barlerin et al. | 384/322 |
| 2009/0067766 A1 | 3/2009 | Maruyama et al. | |
| 2009/0238506 A1 | 9/2009 | Inoue et al. | |

OTHER PUBLICATIONS

Office Action dated Jan. 6, 2014 issued in Chinese Patent Application No. 201080059165.6, 8 pages.

* cited by examiner

FIG 1

(PRIOR ART)

SLIDING BEARING AND SLIDING BEARING ASSEMBLY

This application is a Section 371 National Stage application of International Application No. PCT/KR2010/008729, filed Dec. 8, 2010 and published, not in English, as WO2011/078499 on Jun. 30, 2011.

FIELD OF THE DISCLOSURE

The present disclosure relates to a sliding bearing and a sliding bearing assembly. In more particularly, the present disclosure relates to a sliding bearing that is applied to a joint of a machine, fits on a shaft, and guides axial motion while supplying a lubricant, and a sliding bearing assembly.

BACKGROUND OF THE DISCLOSURE

In general, sliding bearings fitting on a shaft for rotation, movement, and support are used for various joints throughout construction machines, hydraulic equipment, and machines. In the sliding bearing, a lubricant is supplied to the sliding contact surface between a shaft and the bearings supporting the shaft to prevent inner friction. The lubricant is periodically supplied and forms a thin oil layer by flowing on the sliding contact surface between the shaft and the sliding bearing, as the shaft rotates and moves.

In the sliding bearing, the oil layer may partially break when the apparatus stops or operates or variable load is applied to the apparatus from the outside, and the lubricant is exhausted and the oil layer becomes insufficient, when the sliding bearing is used for a predetermined period of time. As described above, when the oil layer is locally disconnected or insufficient, the contact pressure between the shaft and the sliding bearing increases and scorching and sticking is caused between the shaft and the sliding bearing by friction heat due to the contact pressure, thereby increasing the amount of wear.

The conditions of surface pressure and speed of the sliding bearing that is used for various joints with the phenomenon are very various and there is a limit in fitting the conditions of surface pressure and speed within all ranges for one type of sliding bearing to use. Therefore, it is important to reduce scorching and sticking and wear between the shaft and the bearing by disposing an optimal applicable product in the right place within a predetermined range of surface pressure and speed. Further, it is necessary to increase a supply time for the sliding bearing to keep the lubrication effect.

An example of a bearing device configured to prevent scorching and sticking between the shaft and the sliding bearing is disclosed in Korean Patent Application Laid-Open No. 2006-0070264. In this configuration, a shaft is formed in a hollow body with a space to store a lubricant therein such that the storage amount of lubricant increases. In the bearing device, a plurality of holes for supplying a lubricant which are connected to the hollow body is formed in the shaft. The storage for a lubricant formed in the shaft, as described above, increases the time until the lubricant is exhausted, by increasing the amount of lubricant that is supplied to the sliding contact surface, and accordingly, the time of supplying the lubricant increases. However, since the shaft is formed in a hollow body, the rigidity is insufficient in some cases.

Another example of a bearing device configured to prevent scorching and sticking between the shaft and the sliding bearing is disclosed in Korean Patent Application Laid-Open No. 1999-0082076. The bearing device disclosed in the patent has a lubricant pocket on the surface sliding in contact with the shaft, in which the depth is 0.03 mm to 0.3 mm and the ratio of the pocket area to the pocket depth is about 10 to 40 mm. When a lubricant pocket is formed on the sliding contact surface, as described above, the lubricant in the pocket is supplied to the sliding contact surface in sliding, such that local oil layer cut is prevented. However, the depth of the lubricant storage is too small in this configuration, such that the amount of lubricant that can be stored is small and the supply period cannot be extended.

It is impossible to ensure scorching-sticking resistance and wear resistance by extending the supply time even in the bearing devices configured to prevent scorching-sticking on the sliding bearings described above, such that the oil layer may still become insufficient or may be broken within a short time.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Therefore, the present disclosure provides a sliding bearing that can ensure scorching-sticking resistance and wear resistance by improving a lubrication property.

As a result of examining the subject, the present disclosure is directed to provide a sliding bearing that has a lubricant storage, not in a shaft, and does not generate local oil layer disconnection and an insufficient oil layer within a short time, by optimizing the ratio of the volume of the lubricant storage to the entire volume of the sliding bearing into a predetermined value and also optimizing the ratio of the area of the lubricant storage to a contact area between the shaft and the sliding bearing and a predetermined ratio of the area of the lubricant storage to the contact area between the sliding bearing and a boss on the sliding bearing.

Further, an object of the present disclosure is to provide a sliding bearing that can ensure scorching-sticking resistance and wear resistance by improving a lubrication property.

In addition, an object of the present disclosure is to provide a sliding bearing having a lubricant storage having a predetermined area ratio and a predetermined volume ratio.

Furthermore, an object of the present disclosure is to provide a sliding bearing that can be effectively used under specific operating conditions, for example, a surface pressure condition of 100 to 1000 $kg/cm^2$ and a speed condition of 0.005 to 0.1 m/sec.

The present disclosure provides a sliding bearing 100 having an inner circumferential surface 110 and an outer circumferential surface 150 is used under a surface pressure of 100 to 1000 $kg/cm^2$, in which the lubricant storage is formed at least one of the inner circumferential surface 110 and the outer circumferential surface 150 and the ratio of the area of the lubricant storage to at least one of the inner circumferential surface 110 and the outer circumferential surface 150 is 15 to 60%.

According to an example of the present disclosure, the ratio of the area of the lubricant storage to at least one of the inner circumferential surface 110 and the outer circumferential surface 150 is 15 to 40%.

According to an example of the present disclosure, the sliding bearing may be efficiently used at a speed of 0.005 to 0.1 msec.

According to an example of the present disclosure, a first lubricant storage 120 is formed on the inner circumferential surface 110 and a second lubricant storage 160 is formed on the outer circumferential surface 150, and the ratio of the area of the first lubricant storage 120 to the inner circumferential surface 110 is 15 to 60% and the ratio of the area of the second lubricant storage 160 to the outer circumferential surface 150 is 15 to 40%.

According to an example of the present disclosure, the first lubricant storage 120 is composed of a plurality of grooved formed on the inner circumferential surface and the grooves have at least two different shapes and are separated from each other.

According to an example of the present disclosure, when grooves constituting the first lubricant storage include at least one of dimple-shaped grooves 121 having a circular groove-forming surface and pocket-shaped grooves 122 having different axial lengths and circumferential lengths.

Further, according to an example of the present disclosure, the grooves may include arc groove 123 formed around a quarter of or the entire circumference of the inner circumferential surface in the circumferential direction with a uniform width.

According to an example of the present disclosure, the second lubricant storage 160 includes at least one or more of arc grooves 161 formed around a quarter of or the entire circumference of the outer circumferential surface in the circumferential direction with a uniform width.

According to an example of the present disclosure, the first lubricant storage 120 and the second lubricant storage 160 are connected with each other by connection through-holes 170 at least two or more portions.

According to an example of the present disclosure, the volume defined by the first lubricant storage 120 and the second lubricant storage 160 is 5 to 30% of the entire volume of the sliding bearing 100.

The present disclosure also provides a sliding bearing assembly including the sliding bearing 100 described above, a shaft 200 rotatably fitting in the sliding bearing, and a boss 300 fitting on the sliding bearing from the outside of the sliding bearing.

The sliding bearing of the present disclosure has excellent scorching-sticking resistance and wear resistance, because the lubrication property is improved and it is correspondingly possible to reduce the contact pressure on the sliding surface without generating local oil layer cut or a deficit of a lubricant for a short time, When using the sliding bearing according to the present disclosure, it is possible to increase a supply cycle of a lubricant and improve the efficiency of a machine equipped with the sliding bearing.

The sliding bearing according to the present disclosure is very useful particularly under the conditions of the surface pressure of 100 to 1000 kg/cm$^2$ and the speed of 0.005 to 0.1 msec.

DETAILED DESCRIPTION

Hereinafter, the present disclosure will be described in more detail with reference to the drawings and exemplary embodiments.

Sliding bearings usually rotate or vibrate relatively to a shaft or a boss through an oil layer of a lubricant, but a sliding bearing according to the present disclosure has a lubricant storage that can store a lubricant. The lubricant storage is formed on the inner circumferential surface that is a contact surface that slides on a shaft fitting in the sliding bearing and an outer circumferential surface that is a contact surface that comes in contact with a boss fitting on the sliding bearing.

In detail, a sliding bearing 100 according to the present disclosure has an inner circumferential surface 110 and an outer circumferential surface 150 and can be used under a surface pressure of 100 to 1000 kg/cm$^2$, in which the lubricant storage is formed at least one of the inner circumferential surface 110 and the outer circumferential surface 150 and the ratio of the area of the lubricant storage to at least one of the inner circumferential surface 110 and the outer circumferential surface 150 is 15 to 60%.

According to an example of the present disclosure, the ratio of the area of the lubricant storage to at least one of the inner circumferential surface 110 and the outer circumferential surface 150 is 15 to 40%.

According to an example of the present disclosure, the sliding bearing is efficiently used at a speed of 0.005 to 0.1 m/sec.

Figure 1:
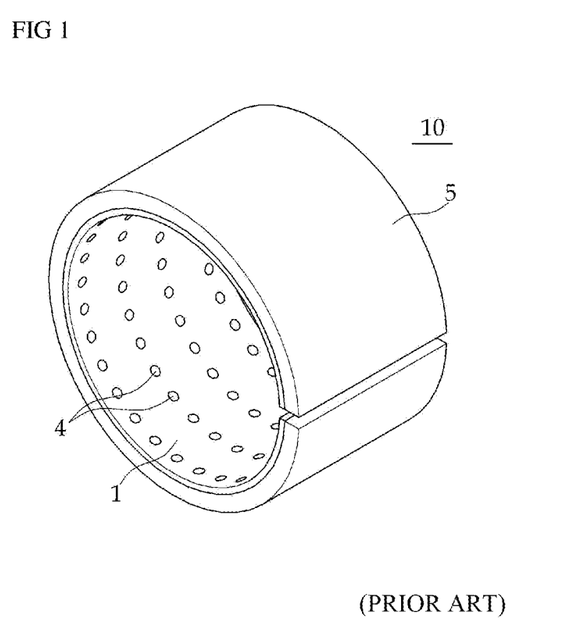
FIG. 1 shows an example of a sliding bearing of the related art.
Figure 2:
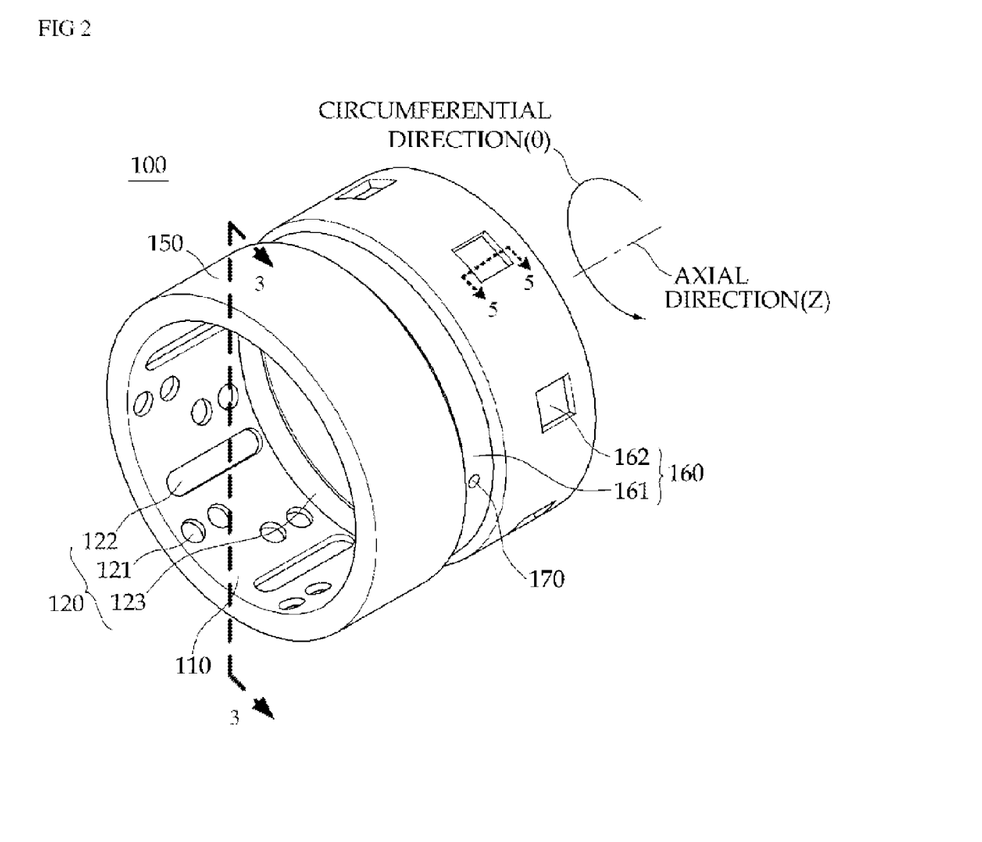
FIG. 2 is a perspective view showing an example of a sliding bearing according to the present disclosure.
Figure 3:
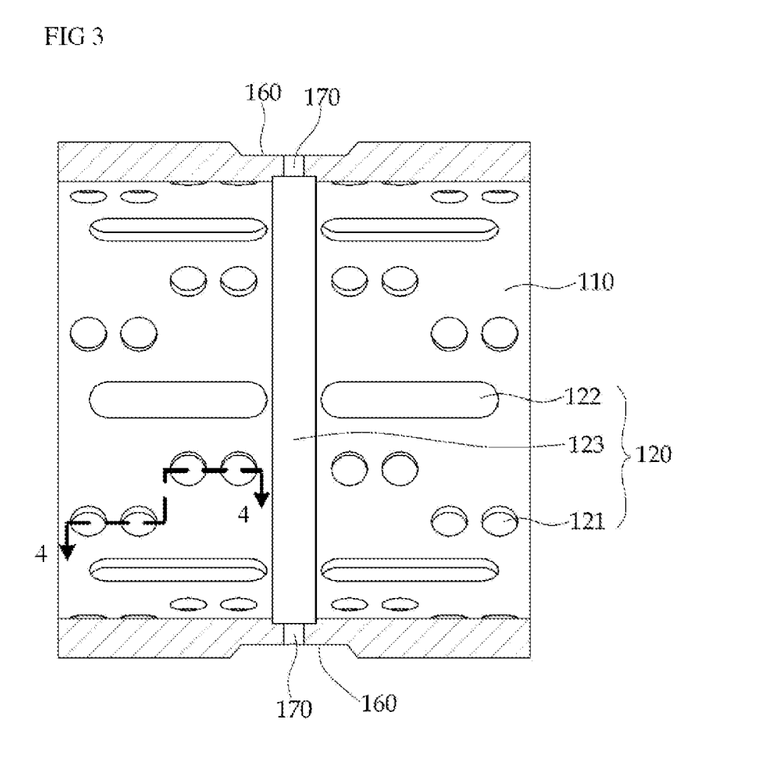
FIG. 3 is a view showing a cross-section of the sliding bearing of FIG. 2, taken in the axial direction, taken generally on the line 3-3.
Figure 4:
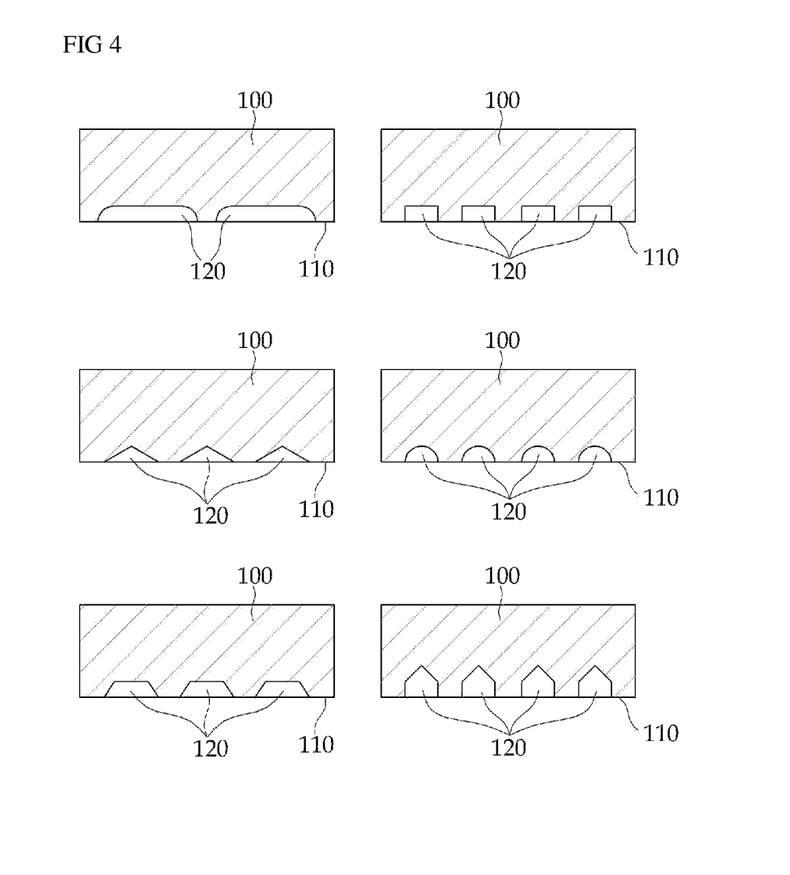
FIG. 4 is a view exemplarily showing cross-sections of various shapes of grooves forming first lubricant storages, as shown in FIG. 3, one example of which is taken generally along the lines 4-4.
Figure 5:
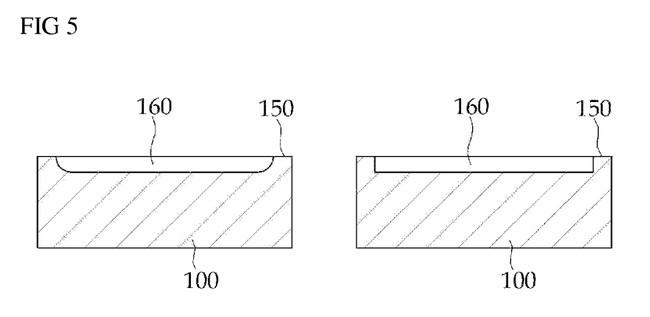
FIG. 5 is a view exemplarily showing cross-sectional shapes of grooves forming second lubricant storages as shown in FIG. 2, an example of which is taken generally along the lines 5-5.

FIG. 2 is an example of a sliding bearing according to the present disclosure and FIG. 3 is a view showing a cross-section of the sliding bearing taken in the axial direction of FIG. 2.

The sliding bearing 100 shown in FIG. 2 has the inner circumferential surface 110 and the outer circumferential surface 150, a first lubricant storage 120 is formed on the inner circumferential surface 1110 and a second lubricant storage 160 is formed on the outer circumferential surface 150. In this configuration, the area ratio of the first lubricant storage 120 formed on the inner circumferential surface 110 is 15 to 60% of the area of the inner circumferential surface 110 and the area ratio of the second lubricant storage 160 formed on the outer circumferential surface 150 is 15 to 40% of the area of the outer circumferential surface 150.

The inner circumferential surface of the sliding bearing of FIG. 2 generally comes in contact with a shaft, and when a lubricant storage (first lubricant storage 120) having an area corresponding to 15 to 60% of the area of the contact area is provided, a lubricant is sufficiently circulated in the sliding bearing and local oil cut is reduced. When the area ratio is less than 15%, the entire lubricant circulation may be insufficient, such that local oil layer cut and heat generation ratio may increase. This phenomenon is generated even under the surface pressure condition of 100 to 1000 kg/cm² and the speed condition of 0.005 to 0.1 msec. On the contrary, when the area ratio is over 60%, the contact surface area without the lubricant storage is too small in the sliding bearing, such that it may be difficult to achieve sufficient load resistance. As a result, the amount of heat generation increases and scorching-sticking is easily generated, such that rapid accelerated-friction is generated, which reduces the lifespan of the bearing device.

Meanwhile, the outer circumferential surface of the sliding bearing generally comes in contact with the boss fitting on the sliding bearing, and the second lubricant storage 160 is formed in an area of 15 to 40% relative to the entire outer circumferential surface of the sliding bearing. The second lubricant storage 160 is connected with the first lubricant storage 120 by at least two or more connection through-holes 170 and supplies the lubricant to the first lubricant storage 120, such that it is possible to sufficiently supply a lubricant even if the sliding bearing 100 operates for a long time.

When the second lubricant storage 160 supplies a lubricant to the first lubricant storage, the shape of the second lubricant storage 160 and the angle of the outer circumferential surface 150 are not that important. Therefore, according to an example of the present disclosure, the second lubricant storage 160 may be formed in a simple shape such as an arc groove 161 formed around a quarter of or the entire circumference of the outer circumferential surface in the circumferential direction with a uniform width. Other shape of groove, for example, the rectangular groove 162 shown in FIG. 2 may be formed as the second lubricant storage 160.

When the second lubricant storage 160 is formed in the arch groove 161, the depth is determined in consideration of the rigidity, machining cost, and time of the sliding bearing 100, and according to the present disclosure, it is preferable make the depth ⅔ of the thickness of the sliding bearing 100.

When the ratio of the area of the second lubricant storage 160 to the outer circumferential surface of the sliding bearing is less than 15%, the amount of stored lubricant to the installation cost of the lubricant storage is small and efficiency is low, it may be difficult to fix the sliding bearing with an external structure such as a boss because the area of the portion that comes in direct contact with the external structure such as a boss fitting on the sliding bearing even if the maximum tightening amount with over 40% of area ratio is set, such that the sliding bearing may be separated from the external structure such as a boss.

According to an example of the present disclosure, the first lubricant storage 120 is composed of a plurality of grooved formed on the inner circumferential surface and the grooves have at least two different shapes and are separated from each other. That is, the lubricant storage formed on the inner circumferential surface of the sliding bearing may have two or more separate shapes not connected with each other.

According to an example of the present disclosure, when grooves constituting the first lubricant storage include at least one of dimple-shaped grooves 121 having a circular groove-forming surface and pocket-shaped grooves 122 having different axial lengths and circumferential lengths.

In an assembly of a sliding bearing according to the present disclosure, the first lubricant storage 120 formed on the inner circumferential surface 110 of the sliding bearing may be shaped to function as a channel for the lubricant and a lubricant storage, like the dimple-shaped groove 121 and the pocket-shaped groove 122. The dimple-shaped groove 121 and the pocket-shaped groove 122 are separately shaped not to be connected with each other.

Further, according to an example of the present disclosure, the grooves may include arc groove 123 formed around a quarter of or the entire circumference of the inner circumferential surface in the circumferential direction with a uniform width. The arc groove 123 can smoothly function of a channel for the lubricant.

The lubricant storages separated not to be connected with each other can perform a function of reducing the actually applied surface pressure and a function of supplying the lubricant to the sliding contact surface.

Meanwhile, it is appropriate to make the lubricant storage of the separate shape such that the ratio of the length of the axial direction z to the length of the circumferential direction θ is less than 1 under the conditions of large load and low speed of the sliding bearing, and it is preferable to make the lubricant storage of the separate shape such that the ratio of the length of the axial direction z to the length of the circumferential direction θ0 or more under the conditions of small load and high speed. Meanwhile, when load is large and speed is high, the lubricant storage of the separate shape may be made such that the ratios of the axial length to the circumferential length are 0 or more and less than 1. This is in connection with the sliding direction and because the ratio of the axial length to the circumferential length less than 1 is advantageous for load-supporting force and the ratio of 0 or more is advantageous at high speed.

According to an example of the present disclosure, the volume defined by the first lubricant storage 120 and the second lubricant storage 160 is 5 to 30% of the entire volume of the sliding bearing 100. That is, the volumes of the lubricant storages 120 and 160 to the entire volume of the sliding bearing 100 are set such that the average volume per unit area is 5 to 30%. In the sliding bearing, when the lubricant storage ensures a volume of 5 to 30% to the entire volume of the sliding bearing, it is possible to perform sufficient lubrication for a long time without local oil layer cut or a deficit of an oil layer on the contact surface of the sliding bearing.

When the volume ratio of the lubricant storages 120 and 150 is less than 5%, the amount of lubricant is insufficient and scorching-sticking is easily generated within a short time, and when the volume ratio is over 30%, the entire rigidity of the sliding bearing is insufficient, such that deformation is easily generated. As a result, abnormal wear or scorching-sticking increases and breakage is easily generated, the supply time becomes very short under a sever condition.

As describe above, the sliding bearing according to the present disclosure is useful particularly at the surface pressure of 100 to 1000 kg/cm² and the speed of 0.005 to 0.1 msec.

The present disclosure also provides a sliding bearing assembly including the sliding bearing 100 described above, a shaft 200 rotatably fitting in the sliding bearing, and a boss 300 fitting on the sliding bearing from the outside of the sliding bearing.

Figure 6:
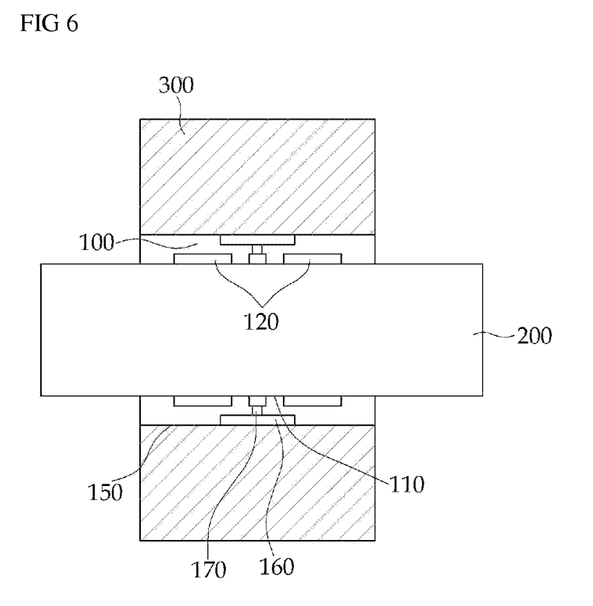
FIG. 6 is a view of a sliding bearing assembly according to the present disclosure in which a shaft, a sliding bearing, and a boss are combined, with the boss shown in cross-section, and with lubricant features on inner and outer surfaces of the sliding bearing being diagrammatically represented.

The sliding bearing assembly exemplified in FIG. 6 may be generally applied to joints of an excavator. The sliding bearing assembly has a basic structure in which the sliding bearing 100 is forcibly fitted and supported in the boss 300 with dimensions of a predetermined-tightening amount, and the shaft 200 is fitted in the sliding bearing 100.

The first lubricant storage 120 composed of grooves having two or more different shapes is formed on the contact surface 110 on which the shaft 200 and the sliding bearing 100 slide to have an area ratio in the range of 15 to 60% to the entire sliding contact area, and the second lubricant storage 160 is formed on the surface 150 where the sliding bearing 100 is forcibly fitted in contact with the boss 300 to have an area ratio to the entire contact area of 15 to 40%. The second lubricant storage 160 is formed in an arc groove 161 machined in the circumferential direction.

The first lubricant storage 120 and the second lubricant storage 160 are connected through two or more connection through-holes 170, and the lubricant in the second lubricant storage 160 moves to the first lubricant storage 120, thereby supplying the lubricant. The volume of the first lubricant storage and the second lubricant storage is set such that the average volume per unit volume of the sliding bearing is in the range of 5 to 30%.

Hereinafter, more detailed exemplary embodiments of the present disclosure will be described through comparative examples and experimental examples.

Embodiments 1 to 7 and Comparative Examples 1 to 5

Manufacturing of Sliding Bearing

Twelve samples of a sliding bearing having dimensions of inner diameter of 70 mm×outer diameter of 85 mm×length of 60 mm were manufactured and carburizing heat treatment was applied to the samples.

First lubricant storages and second lubricant storages were formed in the standards of the following Table 1 in the sliding bearings manufactured as described above and they were applied to the first to seventh embodiments and first to fifth comparative examples.

The grooves formed in the first lubricant storage were disposed at regular intervals. In detail, each dimple-shaped groove 121 was formed to have an area of 200 mm² and a length of 1.5 mm and arc grooves were formed around the inner circumferential surface 110 to have a length in the range of 1 to 1.1 mm and a width of 7 mm.

The cross-section of the second lubricant storage was a rectangle and formed in an arc groove 161 having a length in the range of 1.2 to 1.3 mm.

The entire volume of the sliding bearing was 109,508 mm³ and the entire inner circumferential surface area of the sliding bearing was 13,188 mm².

TABLE 1

| | First lubricant storage | | | | | | Second lubricant storage | | | |
|---|---|---|---|---|---|---|---|---|---|---|
| | Dimple | | | Arc groove | | | Area | Area | Volume | |
| Items | Number | Area (mm²) | Volume (mm³) | Number | Area (mm³) | Volume (mm³) | ratio 1) (%) | ratio 2) (%) | Volume (mm³) | ratio 3) (%) | reference |
| Embodiment 1 | 3 | 600 | 900 | 1 | 1538.6 | 1560.6 | 16.2 | 20% | 3947.0 | 5.9 | |
| Embodiment 2 | 6 | 1200 | 1800 | 1 | 1538.6 | 1560.6 | 20.8 | 20% | 3947.0 | 6.7 | |
| Embodiment 3 | 12 | 2400 | 3600 | 1 | 1538.6 | 1560.6 | 29.9 | 20% | 3947.0 | 8.3 | |
| Embodiment 4 | 18 | 3600 | 5400 | 1 | 1538.6 | 1560.6 | 39.0 | 20% | 3947.0 | 10.0 | |
| Embodiment 5 | 18 | 3600 | 5400 | 1 | 1538.6 | 1560.6 | 39.0 | 40% | 7894.0 | 13.6 | |
| Embodiment 6 | 24 | 4800 | 7200 | 1 | 1538.6 | 1560.6 | 48.1 | 20% | 3947.0 | 11.6 | |
| Embodiment 7 | 6 | 1200 | 1800 | 1 | 1538.6 | 1560.6 | 20.8 | 20% | 3947.0 | 6.7 | |
| Comparative example 1 | 6 | 600 | 1800 | 1 | 1538.6 | 1560.6 | 16.2 | 8% | 1644.6 | 4.6 | |
| Comparative example 2 | 6 | 600 | 1800 | 1 | 1538.6 | 1560.6 | 16.2 | — | — | 3.1 | |
| Comparative example 3 | 0 | — | — | 1 | 1538.6 | 1560.6 | 11.7 | — | — | 1.4 | |
| Comparative example 4 | 2 | 400 | 600 | 1 | 1538.6 | 1560.6 | 14.7 | — | — | 2.0 | |
| Comparative example 5 | 32 | 6400 | 9600 | 1 | 1538.6 | 1560.6 | 60.2 | 20% | 3947.0 | 13.8 | |

1) Area ratio: the ratio of the area of the first lubricant storage to the area of the inner circumferential surface of the sliding bearing
2) Area ratio: the ratio of the area of the second lubricant storage to the area of the outer circumferential surface of the sliding bearing
3) Volume ratio: the ratio of the entire volume of the lubricant storage to the entire volume of the sliding bearing Experimental Example 1

Scorching-Sticking (Seizure) Load Test

A sliding bearing assembly was formed by fitting a journal shaft having a diameter of 70 mm in the sliding bearings 100 manufactured by Embodiments 1 to 7 and Comparative examples 1 to 5 and fitting a boss having a diameter of 85 mm on the sliding bearing.

A grease that is a lubricant was supplied one time to the sliding contact surface which is the inner circumferential surface 110 of the sliding bearing and the outer circumferential surface of the journal shaft and a grease that is a lubricant was also supplied to the outer circumferential surface 150 of the sliding bearing.

The sliding bearing assembly is continuously operated under the condition of a vibration angle of 90° and the maximum vibration speed of 0.1 msec. The load when scorching-sticking was generated was taken as a scorching-sticking load by applying predetermined load to the sliding bearing from the outside for every 1,000 cycles in the continuous operation. The result was shown in Table 2.

TABLE 2

| Item | First lubricant storage Number of dimples | First lubricant storage Area ratio 1) (%) | Second lubricant storage volume (mm³) | Volume ratio 3) (%) | Scorching-sticking load | Reference |
|---|---|---|---|---|---|---|
| Embodiment 1 | 3 | 16.2 | 3947.0 | 5.9 | 27 ton | |
| Embodiment 2 | 6 | 20.8 | 3947.0 | 6.7 | 31 ton | |
| Embodiment 3 | 12 | 29.9 | 3947.0 | 8.3 | 39 ton | |
| Embodiment 4 | 18 | 39.0 | 3947.0 | 10.0 | 45 ton | |
| Embodiment 5 | 18 | 39.0 | 7894.0 | 13.6 | 47 ton | |
| Embodiment 6 | 24 | 48.1 | 3947.0 | 11.6 | 41 ton | |
| Embodiment 7 | 6 | 20.8 | 3947.0 | 6.7 | 33 ton | |
| Comparative example 1 | 6 | 20.8 | 1644.6 | 4.6 | 27 ton | |
| Comparative example 2 | 6 | 20.8 | | 3.1 | 25 ton | |
| Comparative example 3 | | 11.7 | | 1.4 | 15 ton | |
| Comparative example 4 | 2 | 14.7 | | 2.0 | 17 ton | |
| Comparative example 5 | 32 | 60.2 | 3947.0 | 13.8 | 20 ton | |

It can be seen from Embodiments that as the number of dimple-shaped grooves, the area ratio of the first lubricant storage, and the volume ratio of the lubricant storage increase, the scorching-sticking load increases. On the contrary, it can be seen from Comparative example that as the volume ratios and the area ratios of the lubricant storages get beyond the range proposed in the disclosure, the scorching-sticking load is very low.

It can be seen from Experimental example that the most influential factors on the scorching-sticking load are the number of holes and the area ratio of the first lubricant storage, and a difference is generated in effect by an increase in the entire volume ratio of the lubricant storage.

Experimental Example 2

Supply Cycle Test

A supply cycle of how frequently a lubricant is injected, other than the scorching-sticking load, is very important for industrial equipment such as an excavator.

It was tested how long oil layer cut takes to be generated due to a deficit of grease after supplying a grease which is a lubricant one time to a sliding contact surface between a journal shaft and a sliding bearing and supplying a grease one time under the conditions of a vibration angle of 90° and a vibration speed of 0.02 msec while repeating large load and small load, similar to actual work conditions of an excavator in order to see a supply cycle in the present experimental example. The result was shown in the following Table 3.

TABLE 3

| Item | First lubricant storage Number of dimples | First lubricant storage Area ratio 1) (%) | Second lubricant storage volume (mm³) | Volume ratio 3) (%) | Supply time (H) | Reference |
|---|---|---|---|---|---|---|
| Embodiment 1 | 3 | 16.2 | 3947.0 | 5.9 | 150 | |
| Embodiment 2 | 6 | 20.8 | 3947.0 | 6.7 | 180 | |
| Embodiment 3 | 12 | 29.9 | 3947.0 | 8.3 | 250 | |
| Embodiment 4 | 18 | 39.0 | 3947.0 | 10.0 | 500 | |
| Embodiment 5 | 18 | 39.0 | 7894.0 | 13.6 | 600 | |
| Embodiment 6 | 24 | 48.1 | 3947.0 | 11.6 | 550 | |
| Embodiment 7 | 6 | 20.8 | 3947.0 | 6.7 | 240 | |
| Comparative example 1 | 6 | 20.8 | 1644.6 | 4.6 | 100 | |
| Comparative example 2 | 6 | 20.8 | | 3.1 | 80 | |
| Comparative example 3 | | 11.7 | | 1.4 | 50 | |
| Comparative example 4 | 2 | 14.7 | | 2.0 | 60 | |
| Comparative example 5 | 32 | 60.2 | 3947.0 | 13.8 | 200 | |

For example, for an excavator, when the work time for one day is twenty hours, a supply cycle over 140 hours is required to be able to supply a lubricant every week. In embodiments according to the present disclosure, it can be seen that the supply cycle increases with an increase in volume ratio of the lubricant storages.

Meanwhile, although the supply cycle is 200 hours in Comparative example 5, the area ratio of the first lubricant storage is excessively increased to increase the volume ratio of the lubricant storages in Embodiment 5 and the scorching-sticking load decreases as shown in Table 1, and as a result, it is required to frequently supply the lubricant.

Although a joint of an excavator that is construction equipment was exemplified in Embodiments and Experimental examples, the present disclosure is not limited to the joints of a working machine for excavating and may be applied to other equipment.

As described above, the sliding bearing according to the present disclosure can be applied to various joints of working machines and may be applied to construction and civil engineering machinery which is used, for example, under the conditions of a surface pressure 100 to 1000 kg/cm$^2$ and a speed of 0.005 to 0.1 m/sec. The sliding bearing according to the present disclosure is also applied to general machinery such as various hydraulic machines and a compressor in other industrial fields.

Although the present disclosure has been described with reference to exemplary and preferred embodiments, workers skilled in the art will recognize that changes may be made in form and detail without departing from the spirit and scope of the disclosure.

The invention claimed is:

1. A sliding bearing having an inner circumferential surface and an outer circumferential surface is applied to a joint of a machine under a surface pressure of 100 to 1000 kg/cm$^2$ and at a speed within the range of 0.005 to 0.1 m/sec,
   wherein a first lubricant storage, of which the ratio of the area of the first lubricant storage to the inner circumferential surface is from 15 to 60%, is formed on the inner circumferential surface being in contact with a shaft,
   wherein a second lubricant storage, of which the ratio of the area of the second lubricant storage to the outer circumferential surface from 15 to 40%, and connected with the first lubricant storage by connection through-holes thus supplying the lubricant to the first lubricant storage, is formed on the outer circumferential surface,
   wherein the first lubricant storage is composed of a plurality of grooves formed on the inner circumferential surface and the grooves have at least two different shapes and are separated from each other,
   wherein the grooves include at least one of dimple-shaped grooves having a circular groove-forming surface and pocket-shaped grooves having different axial lengths and circumferential lengths.

2. A sliding bearing assembly comprising the sliding bearing of claim 1, a shaft rotatably fitting in the sliding bearing, and a boss fitting on the sliding bearing from the outside of the sliding bearing.

3. The sliding bearing of claim 1, wherein the grooves include an arc groove formed around a quarter of or the entire circumference of the inner circumferential surface in the circumferential direction with a uniform width.

4. A sliding bearing assembly comprising the sliding bearing of claim 3, a shaft rotatably fitting in the sliding bearing, and a boss fitting on the sliding bearing from the outside of the sliding bearing.

5. The sliding bearing of claim 1, wherein the second lubricant storage includes at least one of an arc groove formed around a quarter of or the entire circumference of the outer circumferential surface in the circumferential direction with a uniform width.

6. A sliding bearing assembly comprising the sliding bearing of claim 5, a shaft rotatably fitting in the sliding bearing, and a boss fitting on the sliding bearing from the outside of the sliding bearing.

7. The sliding bearing of claim 1, wherein the first lubricant storage and the second lubricant storage are connected with each other by connection through-holes at least two portions.

8. A sliding bearing assembly comprising the sliding bearing of claim 7, a shaft rotatably fitting in the sliding bearing, and a boss fitting on the sliding bearing from the outside of the sliding bearing.

9. A sliding bearing having an inner circumferential surface and an outer circumferential surface is used under a surface pressure of 100 to 1000 kg/cm2,
   wherein a first lubricant storage, of which the ratio of the area of the first lubricant storage to the inner circumferential surface is from 15 to 60%, is formed on the inner circumferential surface with rubbing against its facing surface,
   wherein a second lubricant storage, of which the ratio of the area of the second lubricant storage to the outer circumferential surface from 15 to 40%, and connected with the first lubricant storage by connection through-holes thus supplying the lubricant to the first lubricant storage, is formed on the outer circumferential surface,
   wherein the first lubricant storage is composed of a plurality of grooves formed on the inner circumferential surface and the grooves have at least two different shapes and are separated from each other,
   wherein the volume defined by the first lubricant storage and the second lubricant storage is 5 to 30% of the entire volume of the sliding bearing.

10. A sliding bearing assembly comprising the sliding bearing of claim 9, a shaft rotatably fitting in the sliding bearing, and a boss fitting on the sliding bearing from the outside of the sliding bearing.

* * * * *